US012784985B2

(12) United States Patent
Kakomura et al.

(10) Patent No.: US 12,784,985 B2
(45) Date of Patent: Nov. 3, 2026

(54) MULTILAYER CERAMIC CAPACITOR INCLUDING VIA CONDUCTORS ARRANGED IN A MATRIX

(71) Applicant: Murata Manufacturing Co., Ltd., Nagaokakyo (JP)

(72) Inventors: Kengo Kakomura, Nagaokakyo (JP); Yukihiro Fujita, Nagaokakyo (JP); Seiji Hidaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 120 days.

(21) Appl. No.: 18/786,661

(22) Filed: Jul. 29, 2024

(65) Prior Publication Data

US 2024/0387113 A1 Nov. 21, 2024

Related U.S. Application Data

(63) Continuation of application No. PCT/JP2023/008255, filed on Mar. 6, 2023.

(30) Foreign Application Priority Data

Mar. 18, 2022 (JP) ................................ 2022-043492

(51) Int. Cl.
*H01G 4/236* (2006.01)
*H01G 4/008* (2006.01)
(Continued)

(52) U.S. Cl.
CPC ............ *H01G 4/236* (2013.01); *H01G 4/008* (2013.01); *H01G 4/1227* (2013.01);
(Continued)

(58) Field of Classification Search
CPC ........ H01G 4/30; H01G 4/232; H01G 4/1236; H01G 4/1227; H01G 4/008; H01G 4/236
See application file for complete search history.

(56) References Cited

U.S. PATENT DOCUMENTS 6,549,395 B1 4/2003 Naito et al.
2004/0257748 A1 * 12/2004 Ritter .................... H01G 4/012 361/306.3

(Continued)

FOREIGN PATENT DOCUMENTS

DE 102006056872 A1 * 6/2008 .............. H01G 4/38
JP H11204372 A 7/1999
JP 2006135333 A 5/2006

OTHER PUBLICATIONS

International Search Report in PCT/JP2023/008255, mailed May 16, 2023, 3 pages.

(Continued)

*Primary Examiner* — David M Sinclair
(74) *Attorney, Agent, or Firm* — Keating & Bennett, LLP

(57) ABSTRACT

A multilayer ceramic capacitor includes a capacitor body including dielectric layers, first and second inner electrodes, first and second via conductors, and first and second outer electrodes. In a reference layout in which m×n (m and n are each a natural number of 4 or more) virtual lattice points are set in a view of the capacitor body seen in a lamination direction, and in which the first and second via conductors are arranged at all the virtual lattice points, the first and second via conductors are not arranged at least in a portion of (m−2)×(n−2) of the virtual lattice points located inside outermost peripheral virtual lattice points.

20 Claims, 10 Drawing Sheets

(51) Int. Cl.
*H01G 4/12* (2006.01)
*H01G 4/232* (2006.01)
*H01G 4/30* (2006.01)

(52) U.S. Cl.
CPC ........... *H01G 4/1236* (2013.01); *H01G 4/232* (2013.01); *H01G 4/30* (2013.01)

(56) References Cited

U.S. PATENT DOCUMENTS

| | | | | |
|---|---|---|---|---|
| 2005/0207093 | A1* | 9/2005 | Togashi | H01G 4/30<br>361/321.2 |
| 2006/0092595 | A1 | 5/2006 | Hwa Lee et al. | |
| 2007/0064374 | A1* | 3/2007 | Togashi | H01G 4/30<br>361/307 |
| 2008/0239685 | A1* | 10/2008 | Kawabe | H05K 3/4046<br>361/782 |
| 2009/0021887 | A1* | 1/2009 | Nakamura | H01G 4/30<br>29/25.03 |
| 2018/0277305 | A1* | 9/2018 | Kawakami | H01G 4/012 |
| 2019/0027312 | A1* | 1/2019 | Muramatsu | H01G 4/12 |
| 2021/0249193 | A1* | 8/2021 | Hirao | H01G 4/0085 |

OTHER PUBLICATIONS

Written Opinion in PCT/JP2023/008255, mailed May 16, 2023, 3 pages.

* cited by examiner

MULTILAYER CERAMIC CAPACITOR INCLUDING VIA CONDUCTORS ARRANGED IN A MATRIX

CROSS REFERENCE TO RELATED APPLICATIONS

This application claims the benefit of priority to Japanese Patent Application No. 2022-043492 filed on Mar. 18, 2022 and is a Continuation Application of PCT Application No. PCT/JP2023/008255 filed on Mar. 6, 2023. The entire contents of each application are hereby incorporated herein by reference.

BACKGROUND OF THE INVENTION

1. Field of the Invention

The present invention relates to multilayer ceramic capacitors.

2. Description of the Related Art

A multilayer capacitor is known in which an equivalent series inductance (ESL) is made small by thickening a current flow route, shortening the current flow route, canceling the magnetic fields generated by currents with different polarities each other, or doing the like. Japanese Unexamined Patent Application Publication No. 2006-135333 discloses an example of a multilayer capacitor having an ESL made small.

A multilayer capacitor 200 disclosed in Japanese Unexamined Patent Application Publication No. 2006-135333 includes a capacitor body 210 in which multiple dielectric layers 201, multiple first inner electrodes 202, and multiple second inner electrodes 203 are laminated, as illustrated in FIGS. 10A and 10B. The capacitor body 210 includes multiple first via conductors 204 electrically connected to the multiple first inner electrodes 202 and extended to one major surface of the capacitor body 210, and multiple second via conductors 205 electrically connected to the multiple second inner electrodes 203 and extended to the one major surface of the capacitor body 210. On the one major surface of the capacitor body 210, multiple first outer electrodes 211 electrically respective multiple first via conductors 204 and multiple second outer electrodes 212 electrically connected to the respective multiple second via conductors 205 are formed. The multiple first outer electrodes 211 and the multiple second outer electrodes 212 are arranged in a matrix form as illustrated in FIG. 10A and the multiple first via conductors 204 and the multiple second via conductors 205 are also similarly arranged in the matrix form.

SUMMARY OF THE INVENTION

However, in a structure like the multilayer capacitor 200 in which the multiple via conductors 204 and 205 are arranged in the matrix form as disclosed in Japanese Unexamined Patent Application Publication No. 2006-135333, an effective area where the first inner electrodes 202 and the second inner electrodes 203 are opposed to each other is reduced and accordingly an electrostatic capacitance is reduced.

Example embodiments of the present invention provide multilayer ceramic capacitors each capable of achieving an electrostatic capacitance increased as compared with a conventional multilayer ceramic capacitor in which via conductors are arranged in a matrix form.

A multilayer ceramic capacitor according to an example embodiment of the present invention includes a capacitor body in which a plurality of dielectric layers, a plurality of first inner electrodes, and a plurality of second inner electrodes are laminated, first via conductors provided inside the capacitor body and electrically connected to the plurality of first inner electrodes, second via conductors provided inside the capacitor body and electrically connected to the plurality of second inner electrodes, first outer electrodes provided on a surface of the capacitor body and electrically connected to the first via conductors, and second outer electrodes provided on a surface of the capacitor body and electrically connected to the second via conductors, in which, in a reference layout in which m×n (m and n are each a natural number of 4 or more) virtual lattice points are set in a view of the capacitor body seen in a laminate direction of the dielectric layers, the first inner electrodes, and the second inner electrodes, and in which via conductors including the first via conductors and the second via conductors are arranged at all the virtual lattice points, the first via conductors and the second via conductors are not arranged at least in portion of (m−2)×(n−2) of the virtual lattice points located inside outermost peripheral virtual lattice points.

According to a multilayer ceramic capacitor of an example embodiment of the present invention, the first via conductors and the second via conductors are not arranged at one to (m−2)×(n−2) of the virtual lattice points located inside the outermost peripheral virtual lattice points among the m×n virtual lattice points, so that it is possible to increase an electrostatic capacitance as compared with a structure in which the via conductors are arranged at all the m×n virtual lattice points.

The above and other elements, features, steps, characteristics and advantages of the present invention will become more apparent from the following detailed description of the example embodiments with reference to the attached drawings.

BRIEF DESCRIPTION OF THE DRAWINGS

FIG. 9A presents an electrostatic capacitance, FIG. 9B presents an ESR, and FIG. 9C presents an ESL.

DETAILED DESCRIPTION OF THE EXAMPLE EMBODIMENTS

Hereinafter, example embodiments of the present invention will be described to specifically explain features of the present invention.

Figure 1:
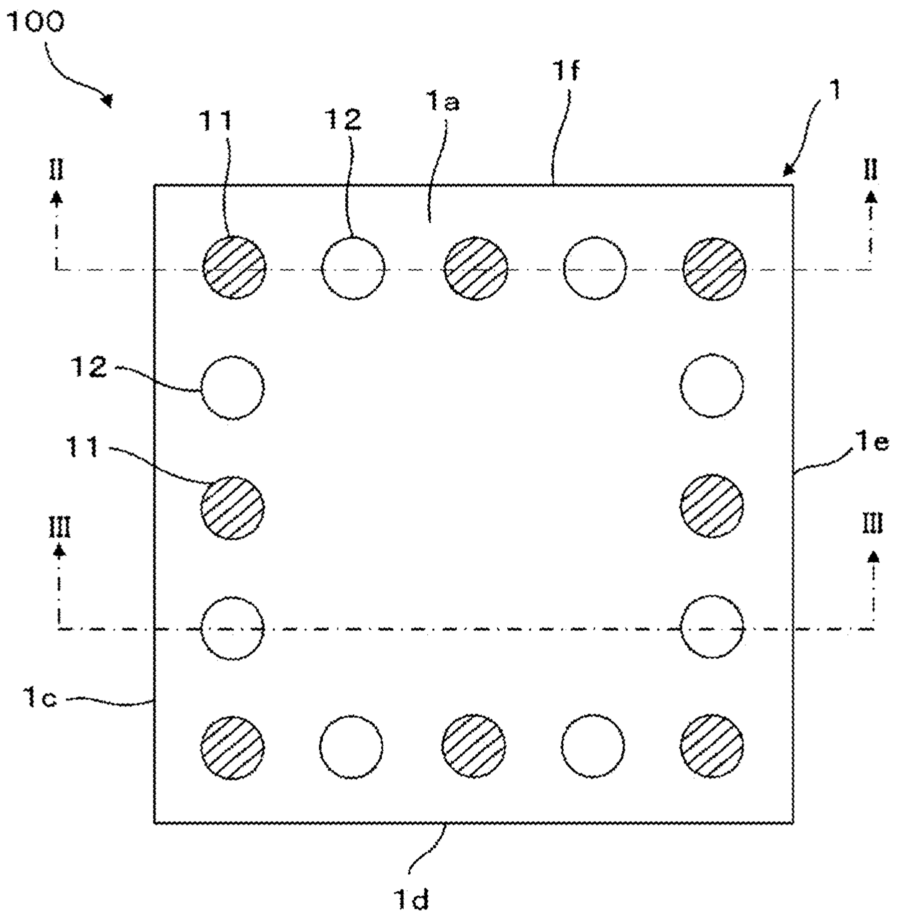
FIG. 1 is a plan view schematically illustrating a multilayer ceramic capacitor according to an example embodiment of the present invention.
Figure 2:
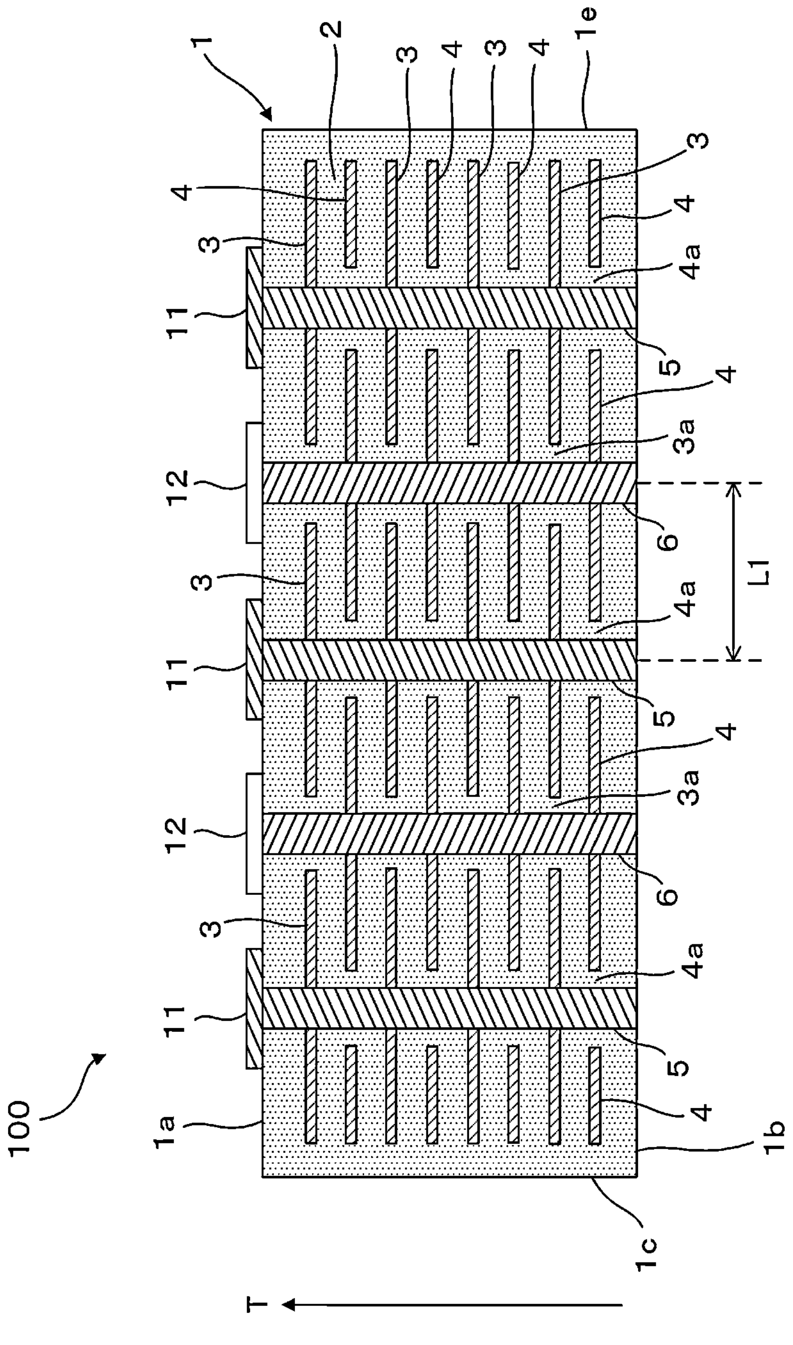
FIG. 2 is a cross-sectional view schematically illustrating a structure of the multilayer ceramic capacitor taken along a II-II line in FIG. 1.
Figure 3:
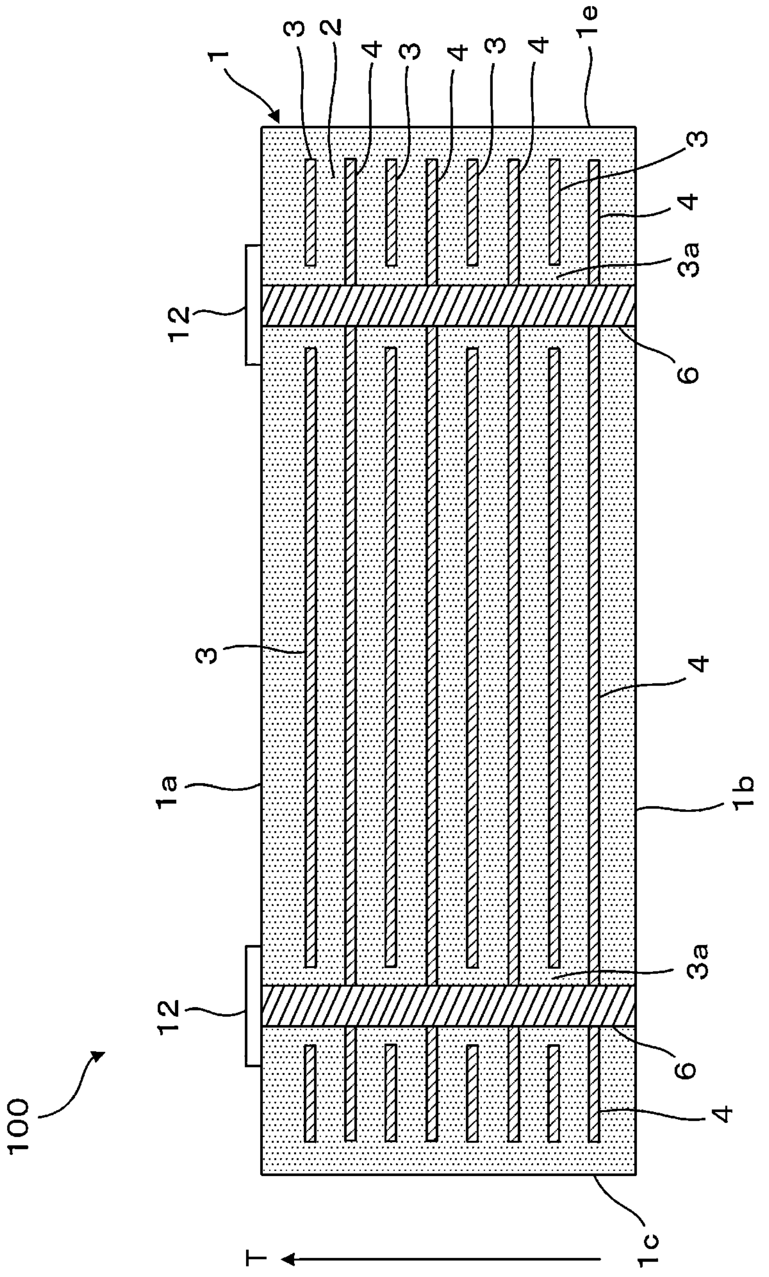
FIG. 3 is a cross-sectional view schematically illustrating a structure of the multilayer ceramic capacitor taken along a III-III line in FIG. 1.

FIG. 1 is a plan view schematically illustrating a multilayer ceramic capacitor 100 in an example embodiment of the present invention. FIG. 2 is a cross-sectional view schematically illustrating a structure of the multilayer ceramic capacitor 100 taken along a II-II line in FIG. 1. FIG. 3 is a cross-sectional view schematically illustrating a structure of the multilayer ceramic capacitor 100 taken along a III-III line in FIG. 1.

The multilayer ceramic capacitor 100 includes a capacitor body 1, first via conductors 5, second via conductors 6, first outer electrodes 11, and second outer electrodes 12.

The capacitor body 1 has a structure in which multiple dielectric layers 2, multiple first inner electrodes 3, and multiple second inner electrodes 4 are laminated. To be more specific, the capacitor body 1 has a structure in which the multiple first inner electrodes 3 and the multiple second inner electrodes 4 are alternately laminated with the dielectric layers 2 interposed in between.

The dielectric layers 2 may be made of any material and, for example, are made of a ceramic material including $BaTiO_3$, $CaTiO_3$, $SrTiO_3$, $SrZrO_3$, or $CaZrO_3$ as a main component. To such main component, a subcomponent such as a Mn compound, a Fe compound, a Cr compound, a Co compound, or a Ni compound may be added whose content is smaller than that of the main component.

The capacitor body 1 may have any shape. In the present example embodiment, the capacitor body 1 has a rectangular or substantially rectangular parallelepiped shape as a whole. The rectangular or substantially rectangular parallelepiped shape as a whole is defined as a shape that has six surfaces and can be regarded as a rectangular parallelepiped as a whole even though the shape is an imperfect rectangular parallelepiped like a rectangular or substantially rectangular parallelepiped shape with rounded corners or edges or a rectangular or substantially rectangular parallelepiped shape with uneven surfaces. Therefore, the capacitor body 1 has a first major surface 1*a*, a second major surface 1*b*, a first side surface 1*c*, a second side surface 1*d*, a third side surface 1*e*, and a fourth side surface 1*f*.

The first major surface 1*a* and the second major surface 1*b* in the capacitor body 1 are surfaces opposed to each other in a laminate direction T of the dielectric layers 2, the first inner electrodes 3, and the second inner electrodes 4. In the present example embodiment, the first major surface 1*a* and the second major surface 1*b* each have a rectangular or substantially rectangular shape, more specifically, a square shape. However, the shape of the first major surface 1*a* and the second major surface 1*b* should not be limited to the rectangular or substantially rectangular shape. The first side surface 1*c* to the fourth side surface 1*f* in the capacitor body 1 are surfaces other than the first and second major surfaces 1*a* and 1*b* among the surfaces of the capacitor body 1. The first side surface 1*c* to the fourth side surface 1*f* in the capacitor body 1 are orthogonal to the first and second major surfaces 1*a* and 1*b*, but do not have be orthogonal to the first and second major surfaces 1*a* and 1*b*.

The capacitor body 1 may have any dimensions. For example, the rectangular or substantially rectangular shape of the capacitor body 1 in plan view may have a lengthwise dimension of about 0.3 mm or more and about 3.0 mm or less and a widthwise dimension of about 0.3 mm or more and about 3.0 mm or less, and a dimension of the capacitor body 1 in the laminate direction T may be about 50 μm or more and about 200 μm or less, for example. The dimension of the capacitor body 1 in the laminate direction T is a thickness of the capacitor body 1.

The first inner electrodes 3 and the second inner electrodes 4 may be made of any materials, and it is possible to use, for example, any of metals such as Ni, Cu, Ag, Pd, Pt, Fe, Ti, Cr, Sn, or Au, alloys including these metals, and so on. The first inner electrodes 3 and the second inner electrodes 4 may include, as a common material, the same ceramic material as the dielectric ceramic material included in the dielectric layers 2. In this case, the percentage of the common material included in the first inner electrodes 3 and the second inner electrodes 4 is, for example, about 20 vol % or less.

Each of the first inner electrodes 3 and the second inner electrodes 4 has any thickness, which may be, for example, about 0.3 μm or more and about 1.0 μm or less. The numbers of the first inner electrodes 3 and the second inner electrodes 4 in the laminate are any numbers, but the total number of both may be, for example, about 10 or more and about 150 or less.

As illustrated in FIG. 2, in each of the first inner electrodes 3, multiple first through holes 3*a* are formed through which the multiple second via conductors 6 to be described later are inserted. In each of the second inner electrodes 4, multiple second through holes 4*a* are formed through which the multiple first via conductors 5 to be described later are inserted.

In the multilayer ceramic capacitor 100, the first inner electrodes 3 and the second inner electrodes 4 are opposed to each other with the dielectric layers 2 interposed in between, thereby generating an electrostatic capacitance.

The first via conductors 5 are provided inside the capacitor body 1 and are electrically connected to the multiple first inner electrodes 3. To be more specific, the first via conductors 5 are provided inside the capacitor body 1 in such a manner that the first via conductors 5 extend in the laminate direction T from the first major surface 1*a* to the second major surface 1*b* of the capacitor body 1. The first via conductors 5 are inserted through the second through holes 4*a* formed in the second inner electrodes 4 and thus are isolated from the second inner electrodes 4.

The second via conductors 6 are provided inside the capacitor body 1 and are electrically connected to the multiple second inner electrodes 4. To be more specific, the second via conductors 6 are provided inside the capacitor body 1 in such a manner that the second via conductors 6 extend in the laminate direction T from the first major surface 1*a* to the second major surface 1*b* of the capacitor body 1. The second via conductors 6 are inserted through the first through holes 3*a* formed in the first inner electrodes 3 and thus are isolated from the first inner electrodes 3.

Although both of the first via conductors 5 and the second via conductors 6 are exposed to the second major surface 1*b* of the capacitor body 1 as illustrated in FIG. 2, the first via conductors 5 and the second via conductors 6 do not have to be exposed.

The first via conductors 5 and the second via conductors 6 may be made of any materials, and it is possible to use, for example, any of metals such as Ni, Cu, Ag, Pd, Pt, Fe, Ti, Cr, Sn, or Au, alloys including these metals, and so on.

The first via conductors 5 and the second via conductors 6 have any shape, but may have, for example, a columnar shape. In this case, the diameter of the first via conductors 5 and the second via conductors 6 is, for example, about 30 μm or more and about 150 μm or less. In addition, a distance between the first via conductor 5 and the second via conductor 6 next to each other, more specifically, a distance L1 between the center of the first via conductor 5 and the center of the second via conductor 6 (see FIG. 2) is, for example, about 50 μm or more and about 500 μm or less.

The first outer electrodes 11 are provided on a surface of the capacitor body 1 and are electrically connected to the first via conductors 5. In the present example embodiment, the first outer electrodes 11 are provided on only one of the first and second major surfaces 1*a* and 1*b* opposed in the laminate direction T among the surfaces of the capacitor body 1. FIG. 2 illustrates a structure in which the first outer electrodes 11 are provided on only the first major surface 1*a* of the capacitor body 1. The number of the first outer electrodes 11 is equal to the number of the first via conductors 5. As described above, the first via conductors 5 are electrically connected to the multiple first inner electrodes 3, and accordingly the first outer electrodes 11 are electrically connected to the multiple first inner electrodes 3.

The second outer electrodes 12 are provided on a surface of the capacitor body 1 and are electrically connected to the second via conductors 6. In the present example embodiment, the second outer electrodes 12 are provided on only one of the first and second major surfaces 1*a* and 1*b* of the capacitor body 1. FIG. 2 illustrates the structure in which the second outer electrodes 12 are provided on only the first major surface 1*a* of the capacitor body 1. The number of the second outer electrodes 12 is equal to the number of the second via conductors 6. As described above, the second via conductors 6 are electrically connected to the multiple second inner electrodes 4, and accordingly the second outer electrodes 12 are electrically connected to the multiple second inner electrodes 4.

The first outer electrodes 11 and the second outer electrodes 12 are made of any materials. In the present example embodiment, the first outer electrodes 11 and the second outer electrodes 12 are plated electrodes formed by plating. Examples of a material for forming the plated electrode include Cu, Ni, Sn, and so on. The plated electrode may have a single layer or multiple layers.

As illustrated in FIG. 1, in the present example embodiment, the first outer electrodes 11 and the second outer electrodes 12 have a circular shape when viewed in the laminate direction T. However, the shape of the first outer electrodes 11 and the second outer electrodes 12 when viewed in the laminate direction T is not limited to the circular shape.

According to an example embodiment of the present invention, layout positions of the first via conductors 5 and the second via conductors 6 are uniquely arranged. Hereinafter, description will be given of the layout positions of the first via conductors 5 and the second via conductors 6 in the multilayer ceramic capacitor 100 in the present example embodiment.

Figure 4:
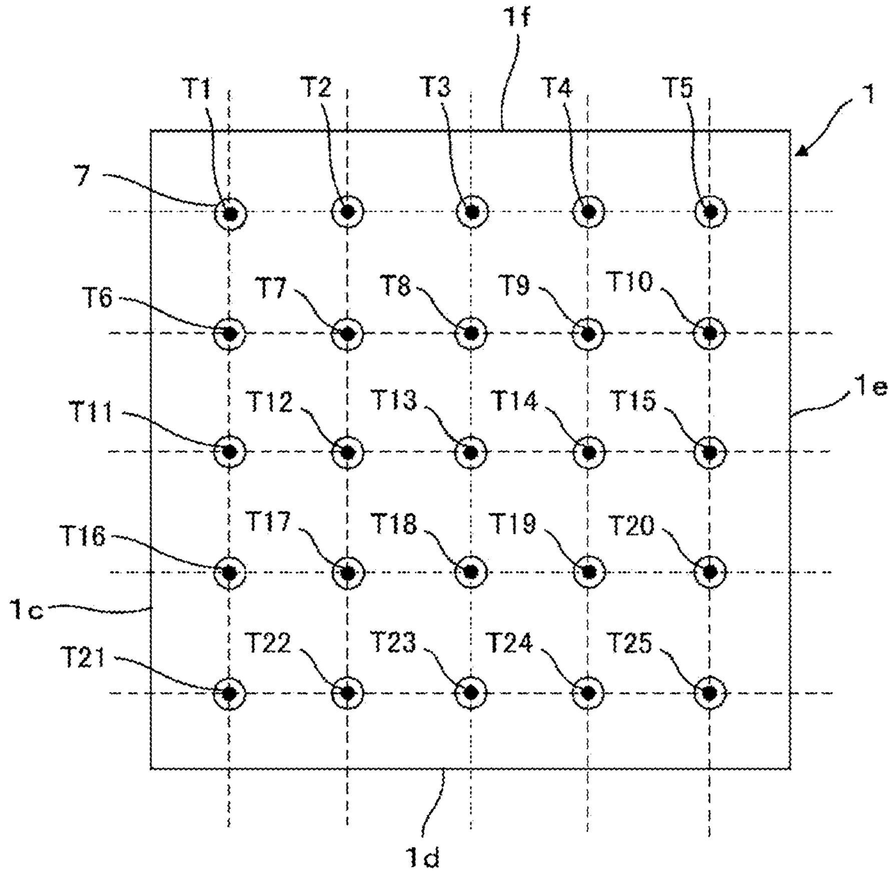
FIG. 4 is a view for explaining a reference layout in which via conductors are arranged at all of m×n virtual lattice points.

As illustrated in FIG. 4, in a view of the capacitor body 1 seen in the laminate direction T, a reference layout is set such that m×n (where m and n each are a natural number of 4 or more) virtual lattice points T1 to Tx (x=m×n) are set, and that via conductors 7 including the first via conductors 5 and the second via conductors 6 are arranged at all the virtual lattice points T1 to Tx. The m×n virtual lattice points are lattice points arranged in a matrix form of m rows and n columns. However, as is apparent from the term "virtual lattice points", the lattice points are not provided visibly in the capacitor body 1. FIG. 4 illustrates an example in which 25 virtual lattice points T1 to T25 are set, where m=5 and n=5. However, m and n are not limited to 5, but each may be any number of 4 or more.

Figure 5:
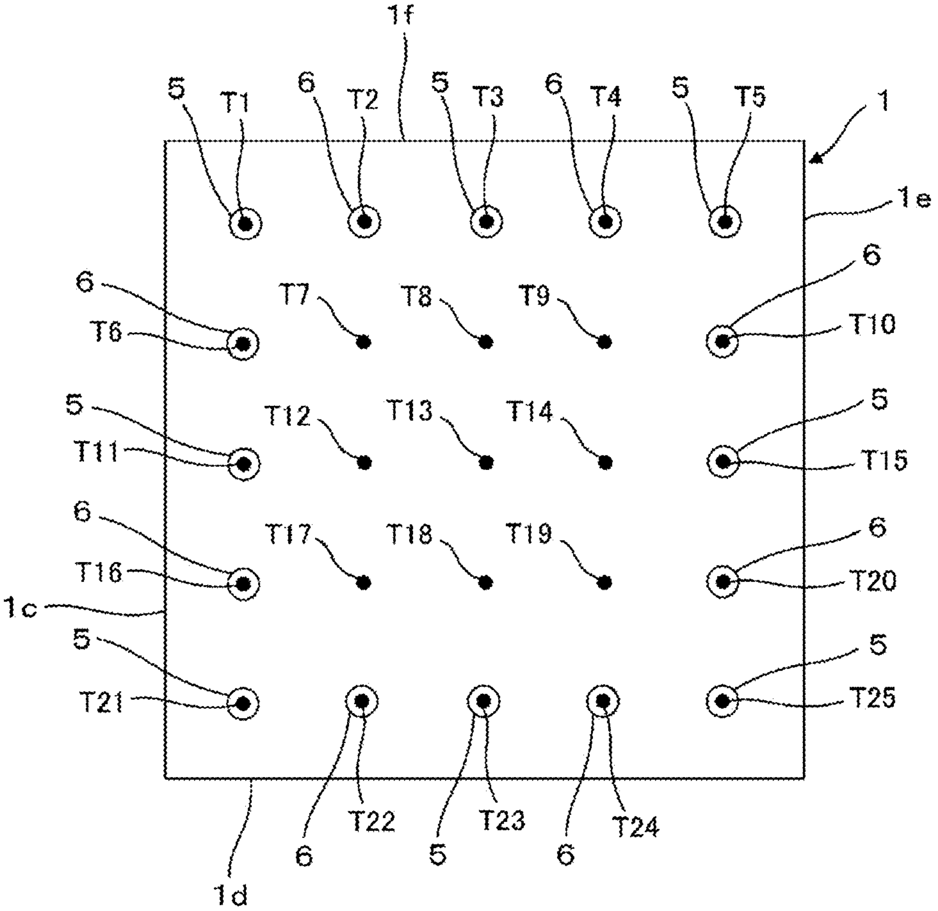
FIG. 5 is a view illustrating layout positions of first via conductors and second via conductors in a multilayer ceramic capacitor according to an example embodiment of the present invention.

As illustrated in FIG. 5, the multilayer ceramic capacitor 100 in the present example embodiment, the first via conductors 5 and the second via conductors 6 are not arranged at one to (m−2)×(n−2) of the virtual lattice points located inside the outermost peripheral virtual lattice points in the reference layout illustrated in FIG. 4. In the example illustrated in FIG. 5, the first via conductors 5 and the second via conductors 6 are not arranged at all the virtual lattice points T7 to T9, T12 to T14, and T17 to T19 located inside the outermost peripheral virtual lattice points in the reference layout illustrated in FIG. 4. In other words, the via conductors including the first via conductors 5 and the second via conductors 6 are arranged only at the outermost peripheral virtual lattice points T1 to T6, T10, T11, T15, T16, and T20 to 25. In the present example embodiment, as illustrated in FIG. 5, the first via conductors 5 and the second via conductors 6 are alternately arranged in each of the row direction and the column direction of the matrix form.

With the structure in which the first via conductors 5 and the second via conductors 6 are not arranged at some of the virtual lattice points as compared with the reference layout in which the via conductors 7 are arranged at all the virtual lattice points T1 to Tx (see FIG. 4), the effective area where the first inner electrodes 3 and the second inner electrodes 4 are opposed to each other in the laminate direction T with the dielectric layers 2 interposed in between is increased and accordingly the electrostatic capacitance is increased.

In particular, as illustrated in FIG. 5, the structure in which the first via conductors 5 and the second via conductors 6 are not arranged at all the virtual lattice points inside the outermost peripheral virtual lattice points in the reference layout makes it possible to further increase the electrostatic capacitance.

Figure 6:
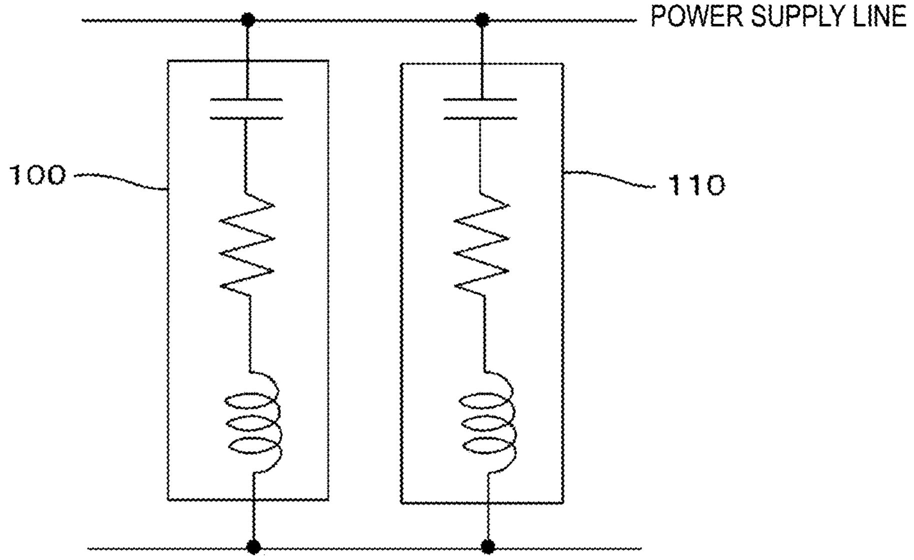
FIG. 6 is a diagram illustrating equivalent circuits of two multilayer ceramic capacitors connected in parallel to a power supply line.

In a structure in which the via conductors are not arranged at some of the virtual lattice points in the reference layout, the ESR (equivalent series resistance) and the ESL (equivalent series inductance) are increased as compared with a multilayer ceramic capacitor having the reference layout. However, when the multilayer ceramic capacitor 100 in the present example embodiment and another multilayer ceramic capacitor 110 with a different electrostatic capacitance are connected in parallel to a power supply line as illustrated in FIG. 6, the increased ESR makes it possible to reduce the magnitude of anti-resonance occurring between the two multilayer ceramic capacitors. FIG. 6 illustrates equivalent circuits of the multilayer ceramic capacitor 100 and the multilayer ceramic capacitor 110 each including a capacitance component (C), a resistance component (R), and an inductance component (L).

Here, the virtual lattice points at which the first via conductors 5 and the second via conductors 6 are not arranged among the virtual lattice points located inside the outermost peripheral virtual lattice points in the reference layout are preferably virtual lattice points corresponding to the via conductors through each of which a small current flows when a voltage is applied between the first and second outer electrodes 11 and 12 in the reference layout. Specifically, when the voltage is applied between the first and second outer electrodes 11 and 12 in the reference layout, the magnitude of the current flowing through each of the first via conductors 5 and the second via conductors 6 varies depending on the positions of the virtual lattice points T1 to Tx. A structure in which the first via conductors 5 and the second via conductors 6 are not arranged at the virtual lattice points corresponding to the via conductors through each of which a small current flows with voltage application makes it possible to reduce an increase in the ESL.

In sum, the structure in which the first via conductors 5 and the second via conductors 6 are not arranged at the virtual lattice points corresponding the via conductors through each of which a small current flows when the voltage is applied between the first and second outer electrodes 11 and 12 in the reference layout among the virtual lattice points located inside the outermost peripheral virtual lattice points in the reference layout makes it possible to achieve both an increase in the electrostatic capacitance and a suppression of an increase in the ESL.

In a case where a large current flows through each of the via conductors 7 located at the virtual lattice points Tl to T5 and a small current flows through each of the via conductors 7 located at the virtual lattice points T21 to T25 when the voltage is applied between the first and second outer electrodes 11 and 12 in the reference layout illustrated in FIG. 4, it is conceivable to form a structure in which the via conductors 7 are not arranged at the outermost peripheral virtual lattice points T21 to T25 through which the small currents flow. However, if a multilayer ceramic capacitor having the above structure is mounted on a substrate or the like in an orientation where the virtual lattice points T1 to T5 side and the virtual lattice points T21 to T25 side are reversed, an increase in the ESL cannot be reduced or prevented and the ESL is increased instead.

However, in the multilayer ceramic capacitor 100 of the present example embodiment in which the first via conductors 5 and the second via conductors 6 are not arranged at the virtual lattice points located inside the outermost peripheral virtual lattice points in the reference layout, an influence of an increase in the ESL depending on the mounting orientation of the multilayer ceramic capacitor 100 is less likely to occur. For example, in a case where multiple virtual lattice points at which the first via conductors 5 and the second via conductors 6 are arranged are in a symmetric layout, such as a line-symmetric or point-symmetric layout, this structure is preferable because there is no influence of an increase in the ESL depending on the mounting orientation of the multilayer ceramic capacitor 100. In particular, in the case where the multiple virtual lattice points at which the first via conductors 5 and the second via conductors 6 are arranged are in a point-symmetric layout as illustrated in FIG. 5, this structure is more preferable because there is no influence of an increase in the ESL depending on the mounting orientation of the multilayer ceramic capacitor 100.

In the present example embodiment, a difference between the number of the first via conductors 5 and the number of the second via conductors 6 is 1 or less. If there is a large difference between the number of the first via conductors 5 and the number of the second via conductors 6, a deviation between the distribution of the currents flowing through the first via conductors 5 and the distribution of the currents flowing through the second via conductors 6 is large and the ESL increases. However, if the difference between the number of the first via conductors 5 and the number of the second via conductors 6 is 1 or less, the aforementioned increase in the ESL can be reduced or prevented. In particular, a structure in which the difference between the number of the first via conductors 5 and the number of the second via conductors 6 is 0 is preferable because the deviation between the distribution of the currents flowing through the first via conductors 5 and the distribution of the currents flowing through the second via conductors 6 can be more reduced or prevented and an increase in the ESL can be more reduced or prevented.

Figure 7A:
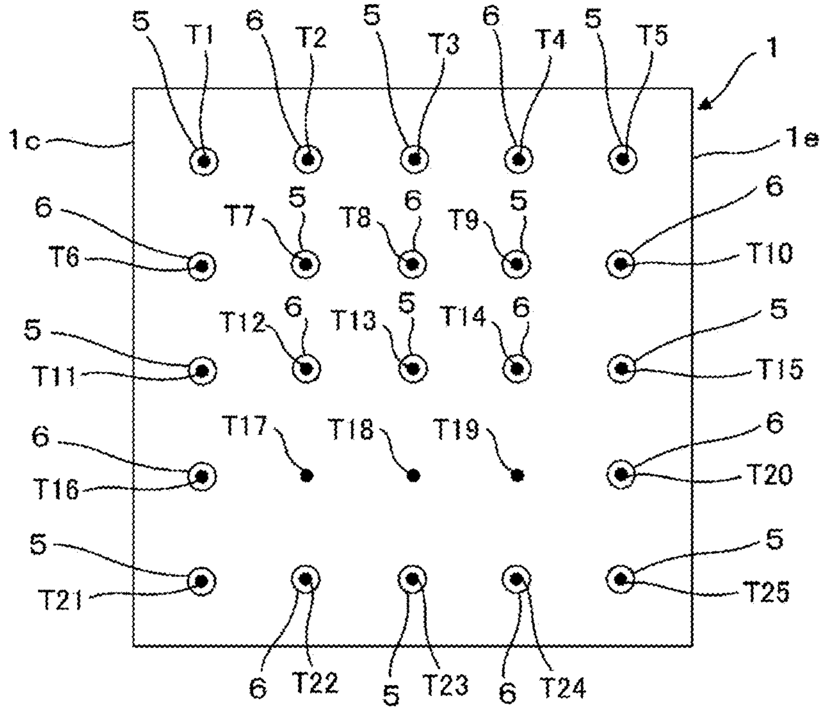
FIGS. 7A and 7B are views illustrating other structural examples in each of which m=n (=5) and the first via conductors and the second via conductors are not arranged at the virtual lattice points located inside the outermost peripheral virtual lattice points in the reference layout.
Figure 7B:
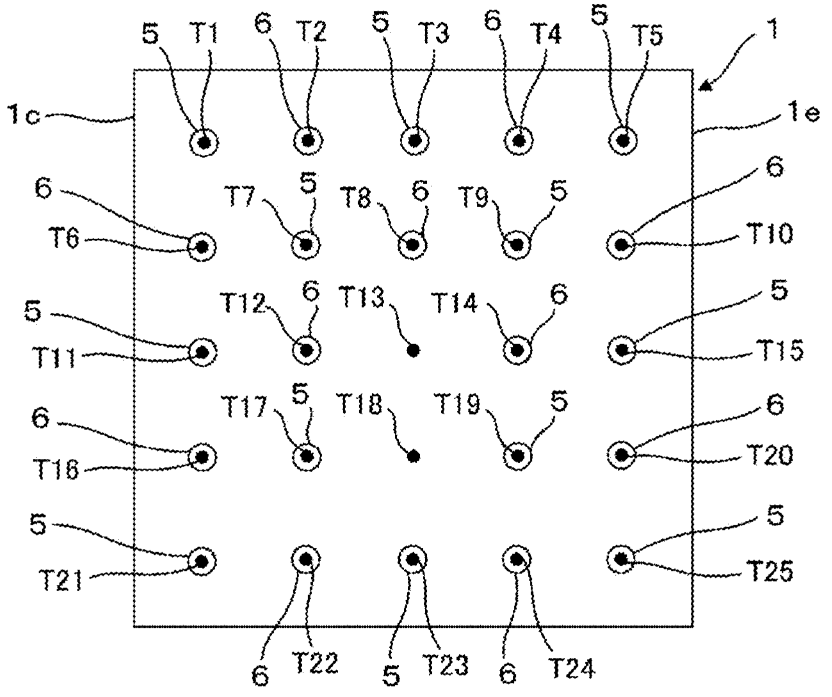

FIGS. 7A and 7B are views illustrating other structural examples in each of which m=n (=5) and the first via conductors 5 and the second via conductors 6 are not arranged at one to (m−2)×(n−2) of the virtual lattice points located inside the outermost peripheral virtual lattice points in the reference layout. In the example illustrated in FIG. 7A, the number of the first via conductors 5 is equal to the number of the second via conductors 6. In the example illustrated in FIG. 7B, a difference between the number of the first via conductors 5 and the number of the second via conductors 6 is 1. As illustrated in FIGS. 7A and 7B, it is possible to use a structure in which the first via conductors 5 and the second via conductors 6 are not arranged at certain virtual lattice points among the virtual lattice points located inside the outermost peripheral virtual lattice points in the reference layout, but it is preferable to use a structure in which the first via conductors 5 and the second via conductors 6 are not arranged at the virtual lattice points corresponding to the via conductors through each of which a small current flows with voltage application as described above.

Figure 8A:
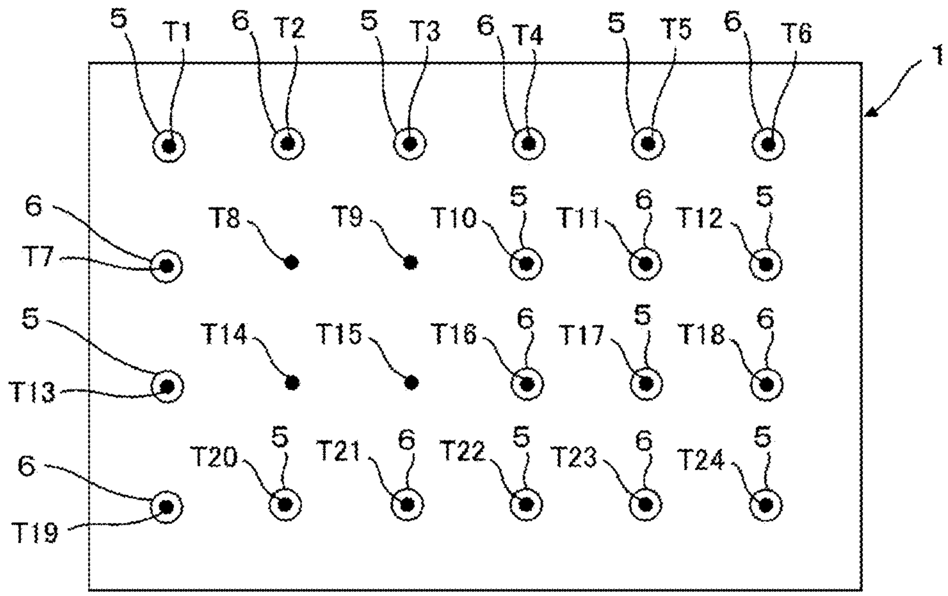
FIGS. 8A and 8B are views illustrating structural examples in each of which men and the first via conductors and the second via conductors are not arranged at the virtual lattice points located inside the outermost peripheral virtual lattice points in the reference layout.
Figure 8B:
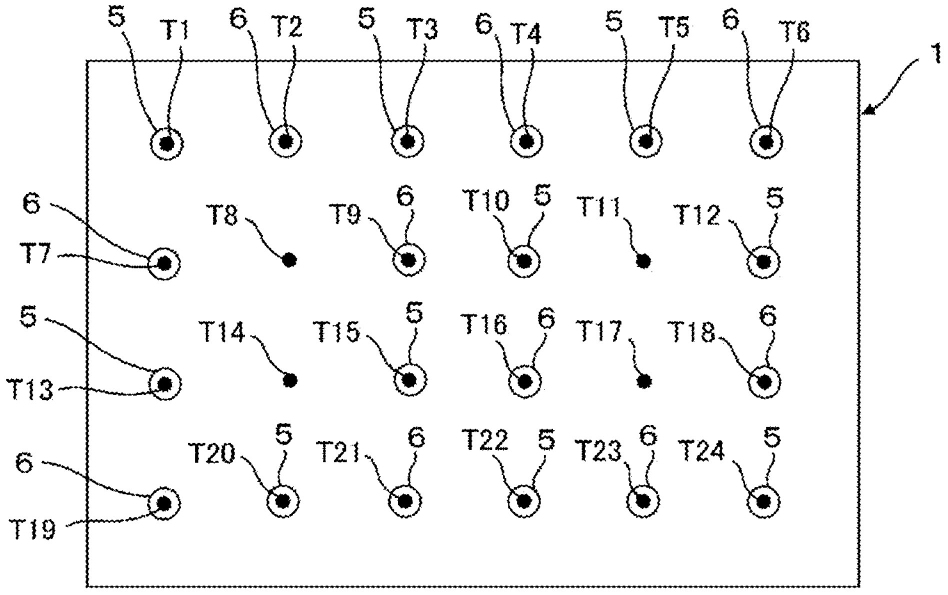

FIGS. 8A and 8B are views illustrating structural examples in each of which m #n and the first via conductors 5 and the second via conductors 6 are not arranged at one to (m−2)×(n−2) of the virtual lattice points located inside the outermost peripheral virtual lattice points in the reference layout. FIGS. 8A and 8B illustrate the examples where m=4 and n=6, but m and n may take any natural numbers as described above. As illustrated in FIGS. 8A and 8B, the first major surface 1*a* and the second major surface 1*b* opposed to the first major surface 1*a* each have a rectangular or substantially rectangular shape.

In the examples illustrated in FIGS. 8A and 8B, the number of the first via conductors 5 is equal to the number of the second via conductors 6. In the example illustrated in FIG. 8B, the multiple virtual lattice points at which the first via conductors 5 and the second via conductors 6 are arranged are in a point-symmetric layout, and there is no influence of an increase in the ESL even if the orientation of the multilayer ceramic capacitor 100 is changed by 180 degrees when the multilayer ceramic capacitor 100 is mounted.

Figure 9A:
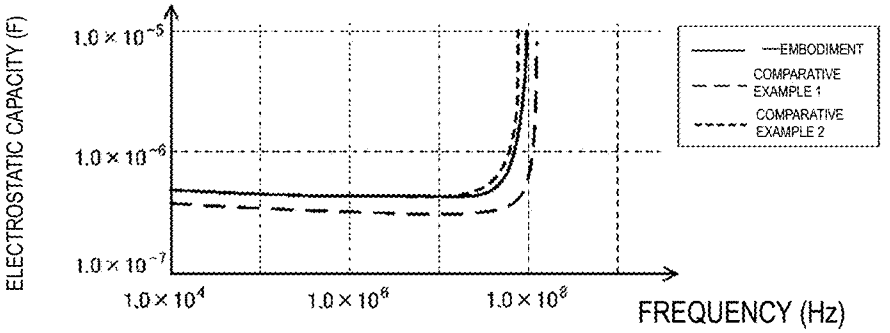
FIGS. 9A to 9C are diagrams presenting measurement results of electrical characteristics of a multilayer ceramic capacitor according to an example embodiment of the present invention, a multilayer ceramic capacitor in Comparative Example 1, and a multilayer ceramic capacitor in Comparative Example 2, where
Figure 9B:
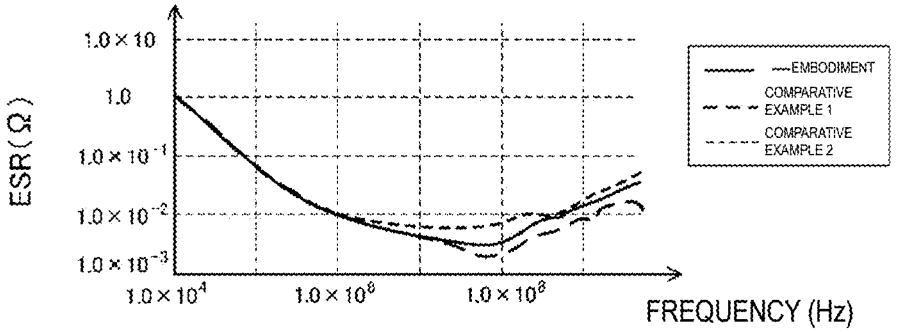
Figure 9C:
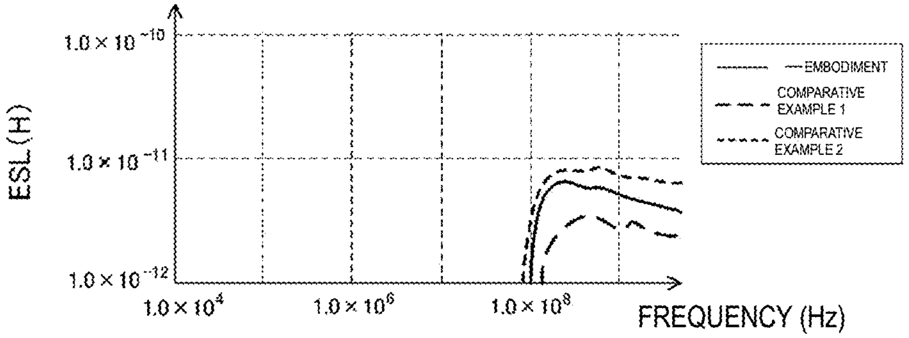
Figure 10A:
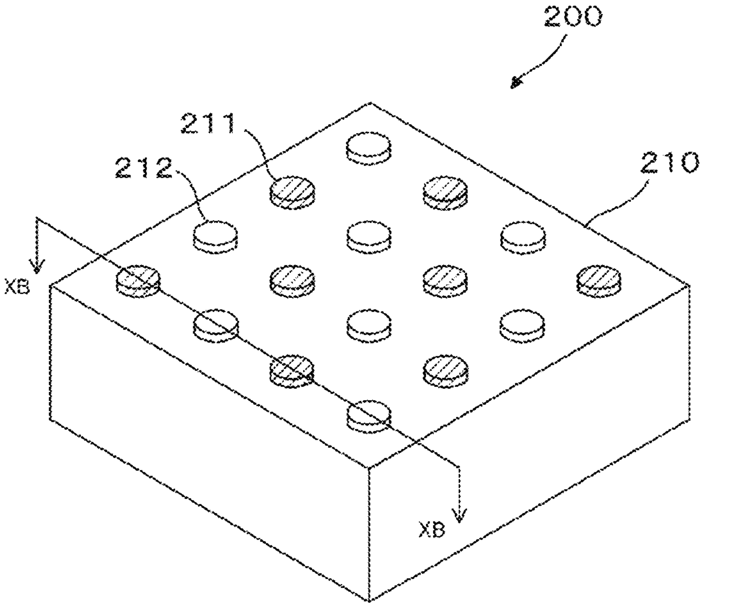
FIG. 10A Prior Art
FIG. 10A is a perspective view schematically illustrating a multilayer capacitor described in Japanese Unexamined Patent Application Publication No. 2006-135333.
Figure 10B:
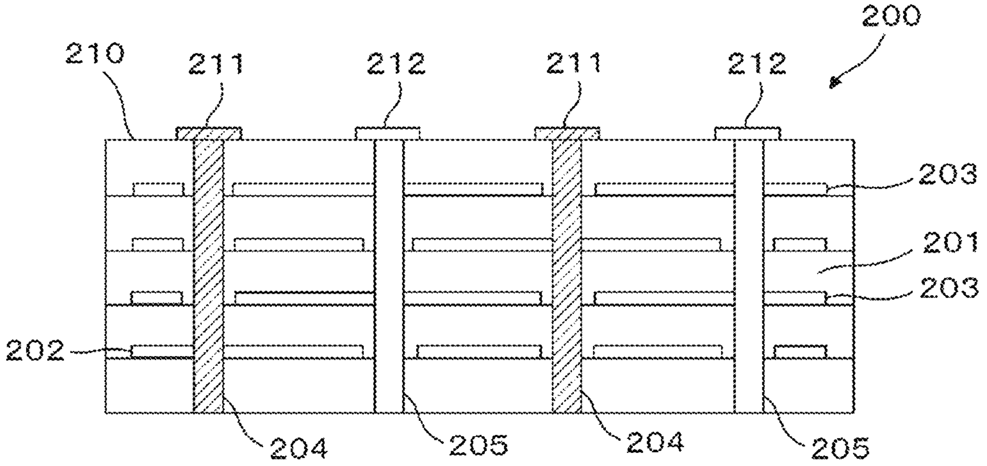
FIG. 10B Prior Art
FIG. 10B is a cross-sectional view schematically illustrating a structure of the multilayer capacitor taken along an XB-XB line in FIG. 10A.

FIGS. 9A to 9C are diagrams presenting measurement results of electrical characteristics of the multilayer ceramic capacitor 100 in the present example embodiment, a multilayer ceramic capacitor having the reference layout illustrated in FIG. 4 (hereinafter, referred to as the multilayer ceramic capacitor in Comparative Example 1), and a multilayer ceramic capacitor in which the first via conductors 5 and the second via conductors 6 are not arranged at some outermost peripheral virtual lattice points T1 to T6, T11, T16, and T21 in the reference layout illustrated in FIG. 4 (hereinafter, referred to as the multilayer ceramic capacitor in Comparative Example 2). Each of the multilayer ceramic capacitors has a capacitance component, a resistance component, and an inductance component as illustrated in FIG. 6. FIG. 9A presents the electrostatic capacitance, FIG. 9B presents the ESR, and FIG. 9C present the ESL.

As presented in FIG. 9A, the multilayer ceramic capacitor 100 in the present example embodiment has the increased electrostatic capacitance as compared with the multilayer ceramic capacitor in Comparative Example 1. Meanwhile, as presented in FIGS. 9B and 9C, the ESR of the multilayer ceramic capacitor 100 in the present example embodiment is higher than the ESR of the multilayer ceramic capacitor in Comparative Example 1 but is lower than the ESR of the multilayer ceramic capacitor in Comparative Example 2. In addition, the ESL of the multilayer ceramic capacitor 100 in the present example embodiment is higher than the ESL of the multilayer ceramic capacitor in Comparative Example 1 but is lower than the ESL of the multilayer ceramic capacitor in Comparative Example 2.

In sum, the multilayer ceramic capacitor 100 in the present example embodiment has the larger electrostatic capacitance than that of the multilayer ceramic capacitor in Comparative Example 1 in which the via conductors are arranged at all the virtual lattice points, and has the lower ESR and ESL than those of the multilayer ceramic capacitor in Comparative Example 2 in which the via conductors are not arranged at some outermost peripheral virtual lattice points in the reference layout.

The present invention is not limited to the aforementioned example embodiments, but may be altered in various applications and modifications within the scope of the present invention. For example, the first outer electrodes 11 and the second outer electrodes 12 are provided on only one of the first major surface 1*a* and the second major surface 1*b* opposed in the laminate direction T among the surfaces of the capacitor body 1 in the foregoing description, but may be provided on both of the first major surface 1*a* and the second major surface 1*b*.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:

a capacitor body in which a plurality of dielectric layers, a plurality of first inner electrodes, and a plurality of second inner electrodes are laminated;

first via conductors provided inside the capacitor body and electrically connected to the plurality of first inner electrodes;

second via conductors provided inside the capacitor body and electrically connected to the plurality of second inner electrodes;

first outer electrodes provided on a surface of the capacitor body and electrically connected to the first via conductors; and second outer electrodes provided on a surface of the capacitor body and electrically connected to the second via conductors; wherein in a reference layout in which m×n (m and n are each a natural number of 4 or more) virtual lattice points are set in a view of the capacitor body seen in a lamination direction of the dielectric layers, the first inner electrodes, and the second inner electrodes, and in which via conductors including the first via conductors and the second via conductors are arranged at all the virtual lattice points, the first via conductors and the second via conductors are not arranged at least in portion of (m−2)×(n−2) of the virtual lattice points located inside outermost peripheral virtual lattice points;

at least one of the first via conductors and the second via conductors is arranged at the virtual lattice points located inside the outermost peripheral virtual lattice points; and at least one of the first and second via conductors at the outermost peripheral virtual lattice points is electrically connected to the first and second outer electrodes separately from the plurality of first and second inner electrodes.

2. The multilayer ceramic capacitor according to claim 1, wherein a difference between a number of the first via conductors and a number of the second via conductors is 1 or less.

3. The multilayer ceramic capacitor according to claim 1, wherein the virtual lattice points at which the first via conductors and the second via conductors are not arranged are the virtual lattice points corresponding to the via conductors through each of which a current flows when a voltage is applied between the first outer electrodes and the second outer electrodes in the reference layout, among the virtual lattice points located inside the outermost peripheral virtual lattice points in the reference layout.

4. The multilayer ceramic capacitor according to claim 1, wherein a plurality of the virtual lattice points at which the first via conductors and the second via conductors are arranged are in a symmetric layout.

5. The multilayer ceramic capacitor according to claim 4, wherein the symmetric layout is line symmetric or point symmetric.

6. The multilayer ceramic capacitor according to claim 1, wherein the first outer electrodes and the second outer electrodes are provided on only one of a first major surface and a second major surface opposed to each other in the lamination direction among surfaces of the capacitor body.

7. The multilayer ceramic capacitor according to claim 1, wherein the capacitor body has a rectangular or substantially rectangular parallelepiped shape.

8. The multilayer ceramic capacitor according to claim 1, wherein the capacitor body has a lengthwise dimension of about 0.3 mm or more and about 3.0 mm or less, a widthwise dimension of about 0.3 mm or more and about 3.0 mm or less, and a dimension in the lamination direction of about 50 μm or more and about 200 μm or less.

9. The multilayer ceramic capacitor according to claim 1, wherein a thickness of each of the first inner electrodes and the second inner electrodes is about 0.3 μm or more and about 1.0 μm or less.

10. The multilayer ceramic capacitor according to claim 1, wherein a total number of the first inner electrodes and the second inner electrodes is about 10 to about 150.

11. The multilayer ceramic capacitor according to claim 1, wherein each of the first via conductors and the second via conductors has a columnar shape.

12. The multilayer ceramic capacitor according to claim 1, wherein a diameter of each of the first via conductors and the second via conductors is about 30 μm or more and about 150 μm or less.

13. The multilayer ceramic capacitor according to claim 1, wherein a distance between one of the first via conductors and one of the second via conductors is about 50 μm or more and about 500 μm or less.

14. The multilayer ceramic capacitor according to claim 1, wherein m and n are each equal to 5.

15. The multilayer ceramic capacitor according to claim 1, wherein a number of the first via conductors and a number of the second via conductors is equal.

16. The multilayer ceramic capacitor according to claim 1, wherein each of the plurality of dielectric layers includes $BaTiO_3$, $CaTiO_3$, $SrTiO_3$, $SrZrO_3$, or $CaZrO_3$.

17. The multilayer ceramic capacitor according to claim 1, wherein each of the plurality of dielectric layers includes a Mn compound, a Fe compound, a Cr compound, a Co compound, or a Ni compound.

18. The multilayer ceramic capacitor according to claim 1, wherein each of the first inner electrodes and the second inner electrodes includes Ni, Cu, Ag, Pd, Pt, Fe, Ti, Cr, Sn, or Au, or an alloy including Ni, Cu, Ag, Pd, Pt, Fe, Ti, Cr, Sn, or Au.

19. The multilayer ceramic capacitor according to claim 1, wherein each of the first inner electrodes and the second inner electrodes includes a same dielectric ceramic material as that included in the plurality of dielectric layers.

20. The multilayer ceramic capacitor according to claim 1, wherein each of the first inner electrodes and the second inner electrodes includes about 20 vol % of less of a same dielectric ceramic material as that included in the plurality of dielectric layers.

* * * * *